United States Patent [19]

Abe et al.

[11] 4,417,640

[45] Nov. 29, 1983

[54] ELECTRICALLY DRIVEN OIL PRESSURED POWER STEERING APPARATUS

[75] Inventors: Michio Abe, Kasugai; Naoyuki Maeda, Inuyama, both of Japan

[73] Assignee: Tokai TRW & Co., Ltd., Aichi, Japan

[21] Appl. No.: 284,539

[22] Filed: Jul. 20, 1981

[30] Foreign Application Priority Data

Oct. 3, 1980 [JP] Japan ............................. 55-138340
Dec. 8, 1980 [JP] Japan ............................. 55-172789

[51] Int. Cl.³ .............................................. B62D 5/06
[52] U.S. Cl. ....................................... 180/142; 180/143; 60/468; 91/438
[58] Field of Search ............... 180/132, 141, 142, 143, 180/148, 133; 60/468; 91/437, 438

[56] References Cited

U.S. PATENT DOCUMENTS

| | | | |
|---|---|---|---|
| 2,219,967 | 10/1940 | Thiry | 91/437 |
| 3,584,460 | 6/1971 | Boyd . | |
| 3,991,846 | 11/1976 | Chichester et al. . | |
| 3,995,711 | 12/1976 | Kittle et al. | 180/133 |
| 4,056,160 | 11/1977 | Abels et al. | 180/143 |
| 4,212,366 | 7/1980 | Ohtuka et al. . | |
| 4,274,504 | 1/1981 | Kawabata et al. | 180/143 |
| 4,300,650 | 11/1981 | Weber | 180/142 |

FOREIGN PATENT DOCUMENTS

| | | | |
|---|---|---|---|
| 44733 | 1/1982 | European Pat. Off. . | |
| 2915890 | 11/1980 | Fed. Rep. of Germany . | |
| 55-55059 | 4/1980 | Japan . | |
| 2069429 | 8/1981 | United Kingdom | 180/132 |

Primary Examiner—John A. Pekar
Assistant Examiner—D. Lynn Fugate
Attorney, Agent, or Firm—Yount & Tarolli

[57] ABSTRACT

An electrically driven oil pressured power steering apparatus is disclosed herein. The apparatus comprises an oil pump driven by an electric motor for supplying a working oil to a power cylinder, a control valve for controlling the supply of the working oil and a manipulating apparatus and an electronically operated on-off means which, in common, control a power supply to the electric motor. In the apparatus, a state of power steering is shifted to a state of manual steering in accordance with a stop of the electric motor effected by the electronically operated on-off means.

16 Claims, 14 Drawing Figures

ELECTRICALLY DRIVEN OIL PRESSURED POWER STEERING APPARATUS

FIELD OF THE INVENTION

This invention relates generally to a power steering apparatus and, more particularly, to a power steering apparatus in which an electric motor is started or stopped by means of a switching means which is controlled in response to the speed of a car. Either power steering or manual steering can be obtained in accordance with the operation of a pump driven by the electric motor. A bypass valve is provided between conduits for supplying working fluid to a power cylinder. This invention further relates to a power steering apparatus in which a power steering pump is driven by an electric motor only when the engine of a vehicle is being operated.

DESCRIPTION OF THE PRIOR ART

During operation of a vehicle at relatively low speeds, such as during parking, there is a relatively large resistance to turning movement of steerable vehicle wheels. Therefore, relatively large fluid pressures are desirable to actuate a power steering motor at low vehicle speeds. As vehicle speed increases, the resistance to turning movement of the steerable vehicle wheels decreases. Therefore, the fluid pressure required to actuate the power steering motor decreases as vehicle speed increases. During operation of a vehicle at relatively high speeds, the assistance provided by a power steering motor should be minimized to reduce energy requirements, prevent excessive turning movement of the vehicle wheels in response to small movements of the steering wheel and to provide the operator of the vehicle with a feel for road conditions.

In the prior power steering apparatus, fluid pressure supplied to a power cylinder is controlled by a reaction pressure or by bypassing fluid by means of a solenoid type electro-magnet valve. The efficiency of the pump becomes worse as vehicle speed increases due to an over circulation of the working oil at a high speed with a resulting waste of energy. The electro-magnet used to actuate a changing-over valve for controlling the bypass of fluid may not last long and become expensive to keep it in good operating condition. These were recognized as principal defects.

The constant pressure control of the relief apparatus for the working oil in a known power steering apparatus may cause the temperature of the working oil to rise. This is because the oil pump, in general, operates under the maximum oil pressure by keeping a valve near to the maximum relief pressure. This is also recognized as a defect.

SUMMARY OF THE INVENTION

A power steering apparatus constructed in accordance with the present invention is used to turn a steerable wheel of a vehicle in response to rotation of a steering wheel. The apparatus includes a pump which is driven by an electric motor to supply fluid to a power steering motor. Upon initiation of a steering operation at relatively low vehicle speeds, an electronic device, such as a thyristor or transistor, is changed from a nonconducting state to a conducting state to initially energize the electric motor which drives the power steering pump. Once the motor has been initially energized by current conducted through the electronic device, a pair of relay contacts are closed to complete a parallel circuit through which current is conducted to the electric motor to drive the power steering pump at a relatively high speed. This enables the electric motor to be quickly energized upon initiation of a steering operation and tends to enhance the operating life of the relay contacts since the electric motor has started to operate before the contacts close.

In accordance with another feature of the present invention, the current for energizing the electric motor is conducted through the relay contacts only when the vehicle speed is below a predetermined speed. Thus, at relatively low vehicle speeds, the relay contacts are closed to increase the current conducted to the electric motor to drive the pump at a relatively high angular velocity. However, at vehicle speeds above the predetermined speed, the relay contacts are not closed. This results in the electronic device conducting a reduced current to operate the motor to drive the pump at a reduced angular velocity as the vehicle speed increases.

If the electric motor is operated to drive the power steering pump before the engine of the vehicle is started, the electric motor would discharge the battery. In order to prevent this from happening, the electric motor is operated to drive the power steering pump only when a signal generator, driven by the engine of the vehicle, provides an output signal indicating that the engine is running. At relatively high vehicle operating speeds, the resistance to turning movement of the steerable vehicle wheels is so small as not to require power assistance. Therefore, at these speeds a bypass valve is opened to connect opposite chambers of the power steering motor in fluid communication with each other. At this time a manual steering operation can be undertaken with relatively little resistance from the power steering motor.

Accordingly, it is an object of this invention to provide a new and improved apparatus for operating a power steering motor and turning a steerable vehicle wheel in response to rotation of a steering wheel and wherein an electric motor is quickly energized upon rotation of a steering wheel by electrical energy conducted through an electronic device and then by electrical energy conducted through subsequently closed contacts.

Another object of this invention is to provide a new and improved apparatus for operating a power steering motor and turning a steerable vehicle wheel in response to rotation of a steering wheel and wherein a first circuit conducts electrical energy to energize an electric motor to drive the power steering fluid supply pump at a relatively high angular velocity during rotation of the steering wheel while the vehicle is traveling at a low speed and a second circuit conducts electrical energy to energize the motor to drive the pump at a relatively low angular velocity during rotation of the steering wheel while the vehicle is traveling at a higher speed.

Another object of this invention is to provide a new and improved apparatus for operating a power steering motor to turn a steerable vehicle wheel and wherein a bypass valve is opened upon operation of an electric motor to drive the power steering fluid supply pump while the vehicle is traveling at speeds which are less than a predetermined speed, the bypass valve being operated from the open condition to the closed condition upon interruption of rotation of the steering wheel, and wherein the bypass valve is maintained in the open condition during rotation of the steering wheel at vehicle speeds above the predetermined speed.

Another object of this invention is to provide a new and improved apparatus for operating a power steering motor and turning a steerable vehicle wheel wherein a signal generator provides an output signal only during operation of the engine and an electric motor is energized to drive a power steering fluid supply pump only when the signal generator means is providing an output signal.

The foregoing objects and other objects as well as the characteristic features of this invention will become more apparent and more readily understandable by the following description and the appended claims when read in conjunction with the accompanying drawings.

DETAILED DESCRIPTION OF THE PREFERRED EMBODIMENT

Figure 1:
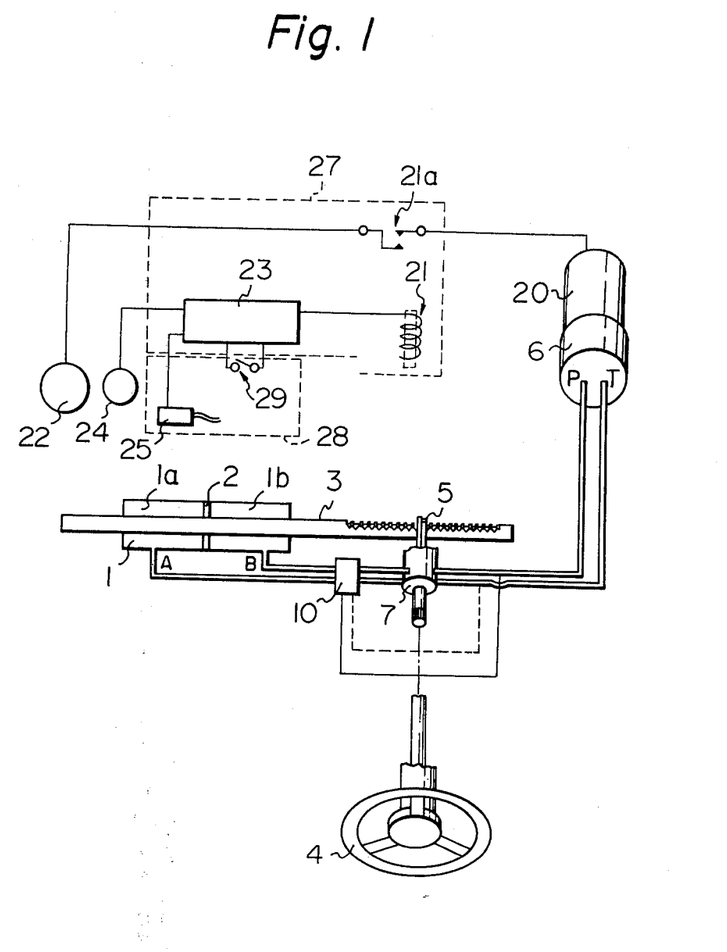
FIG. 1 is a schematic drawing of a power steering apparatus constructed in accordance with the present invention and illustrating the relationship between a power steering motor for turning a steerable vehicle wheel, a pump for supplying fluid to operate the power steering motor, an electric motor for driving the pump, and controls for regulating the operation of the electric motor.

In FIG. 1, a power steering apparatus for turning a steerable vehicle wheel is illustrated. The power steering apparatus is mounted on the vehicle and includes a piston rod 3 which extends through a power cylinder 1. The cylinder 1 is divided by a piston 2 into two chambers 1a and 1b. A rack and pinion gear mechanism 5 is provided at one end of piston rod 3 and is operably connected to a steering wheel 4 through a control valve 7. A port A of chamber 1a (as shown in the left side in FIG. 1) and a port B of chamber 1b (as shown in the right side in FIG. 1) of power cylinder 1 are connected to either a supply port P or a return port T of an electrically driven oil pump 6 so as to communicate with oil pump 6 through a bypass valve 10 and a control valve 7. During a power steering operation, the bypass valve 10 connects chambers 1a and 1b of power cylinder 1 in fluid communication with each other. Upon initiation of a steering operation, the bypass valve 10 closes, due to a pressure difference existing between a line pressure port of the bypass valve, which is connected to the supply port P of the oil pump, and a tank port of the bypass valve, which is connected to the return port T of the oil pump.

Figure 7:
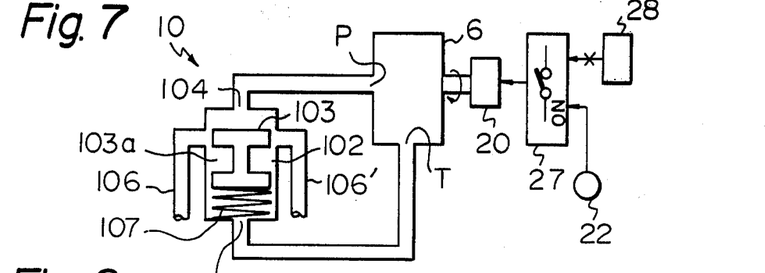
FIG. 7 is a schematic illustration depicting the relationship between a bypass valve and a pair of conduits for conducting fluid to a power steering motor, the bypass valve being shown in a closed condition blocking fluid communication between the two motor conduits.
Figure 8:
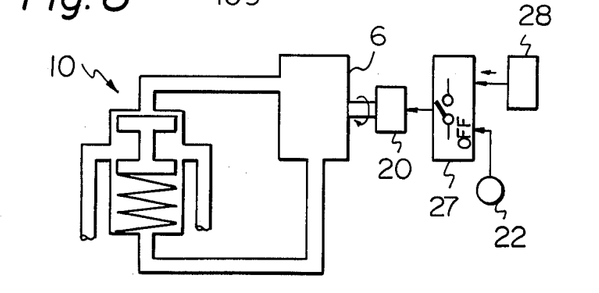
FIG. 8 is a schematic illustration, generally similiar to FIG. 7, illustrating the bypass valve in an open condition connecting the two motor conduits in fluid communication.

The construction and the operation of bypass valve 10 are illustrated in FIGS. 7 and 8. Bypass valve 10 is provided with a spool 103 which freely slides within a cylinder 102. A BP line pressure port 104 provided at one end of cylinder 102 is connected to a supply port P of oil pump 6. A BT tank port 105 provided at the other end of the bypass valve 10 is connected to a return port T of oil pump 6. The oil pump 6 is driven by an electric motor 20. The electric motor 20 is excited by an electrical source or battery 22 through an electronically operated on-off or switching means 27 and by a manipulator means 28. A BA port 106 and a BB port 106', respectively, connected to a port A and a port B, which are connected to power cylinder 1, are provided nearly at the center part of cylinder 102 to communicate therewith. BA port 106 and BB port 106' are communicated with each other by a slot 103a provided at the outer periphery of spool 103 and this communication may be cut off due to the sliding of spool 103. Spool 103 is normally urged toward BP line pressure port 104 by a spring 107 encased in cylinder 102 to be in the position shown in FIGS. 7 and 8.

As the oil pump 6 does not rotate when electrical motor 20 stops and no working oil exists nor pressure is applied to BP line pressure port 104 from supply port P. Spool 103 is pushed up to the position shown in FIG. 8 by spring 107 to make a communication between BA port 106 and BB port 106'. Under this condition, ports A and B of power cylinder 1 are bypassed to release the power and a state of manual steering is provided.

Oil pump 6 rotates when electric motor 20 is operating and the pressure of the working oil is applied to BP line pressure port 104 from supply port T as a pilot pressure to push spool 103 down to the position when in FIG. 7 against spring 107. Accordingly, the communication between BA port 106 and BB port 106' is disconnected. Under this condition, as the ports A and B of power cylinder 1 are not bypassed, the pressure of the working oil coming from oil pump 6 acts directly on cylinder 1 to provide state of power steering.

An electric motor 20 (FIG. 1) drives the oil pump 6. The motor is connected to the battery 22 which is mounted on the car through an electronically operated on-off means 27. The switching or on-off means 27 includes a relay 21 which closes a relay contact 21a upon being energized. A controller 23 for effecting actuation of the relay 21 upon initiation of a power steering operation is electrically connected to an engine driven alternator 24 and a manipulator means 28 so as to receive electrical signals therefrom. Manipulator means 28 includes a car-speed sensor 25 and a drive sensor 29. Car-speed sensor 25 detects the speed of the car and supplies controllers 23 electrical voltages which are generated in response to the speed. The car-speed sensor is exemplified as a pulse encoder, a small sized alternator or a speedmeter and etc. Drive sensor 29 supplies an electrical signal to controller 23 to control it in an on or off condition.

The operation of the embodiment shown in FIG. 1 is explained as follows:

When the vehicle is started, the engine drives the alternator 24 to provide an output signal to the controller 23. This output signal activates the controller 23. Alternatively, after the engine has started and is driving the alternator 24, a time lag is set from the time when the signal from the alternator 24 is supplied to controller 23. This results in a time delay between the starting of engine and the activation of controller 23. Then, a signal from car-speed sensor 25 and drive sensor 29 are applied to controller 23 so that controller 23 energizes relay 21 to close relay contact 21a. Electric motor 20 is started by being excited from electric source 22 to rotate a drive shaft for the oil pump 6. The working oil sent forth from oil pump 6 is supplied to chamber 1a or chamber 1b through the port A or the port B from the supply port P through control valve 7. Upon rotation of the steering wheel 4 and actuation of the steering control valve 7, piston 2 of power cylinder 1 moves either toward chamber 1a or chamber 1b with piston rod 3. The movement of the piston 2 assists the turning of the steerable vehicle wheels by the rack and pinion gear mechanism 5.

The electrical voltage which is generated by car-speed sensor 25 in response to the speed of the car is applied to controller 23. When the electrical voltage reaches a predetermined magnitude, in other words, when the speed of the car increases to a predetermined speed, controller 23 actuates relay 21 to open relay contact 21a. This interrupts the flow of current to the electric motor 20 and, therefore, stops rotation of oil pump 6. Therefore, the supply of the working oil to power cylinder 1 is also stopped. Thereafter, when the speed of the car decreases and the electrical voltage generated by car-speed sensor 25 drops from the predetermined fixed level, relay contact 21a is again closed to energize the motor 20 and reestablish the supply of the working oil from the pump 6.

In the embodiment described above, the vehicle speed at which controller 23 opens relay contact 21a is set at a relatively low speed, for example at a speed of about 30 km/hr order. Alternatively, controller 23 may be set to energize electric motor 20 only at the time of forward moving under a low speed and of backward moving by detecting the signal coming from manipulator means 28 from the alternator 24. Further, the electric motor 20 may be operated after a predetermined fixed time, for example after 1 or 2 seconds, after the engine of the car is started.

In the embodiment described above, drive sensor 29 may be set to excite electric motor 20 by controller 23 after receiving signals coming from the steering wheel, the power missionary mechanism, the accelerator, the brake pedal or the clutch pedal and etc. or may be set to stop the excitation to electric motor 20 after a predetermined fixed time by means of a timer, in which case the timer may be constructed to operate after receiving the signals referred to above.

As stated above, the controller 23 stops operation of electrical motor 20 at relatively low vehicle speeds. A state of power steering can easily be changed to manual steering as vehicle speed increases. This is accomplished by stopping the electric motor 20 and actuating the bypass valve 10 to connect the motor cylinder chambers 1a and 1b in fluid communication with each other.

Figure 2:
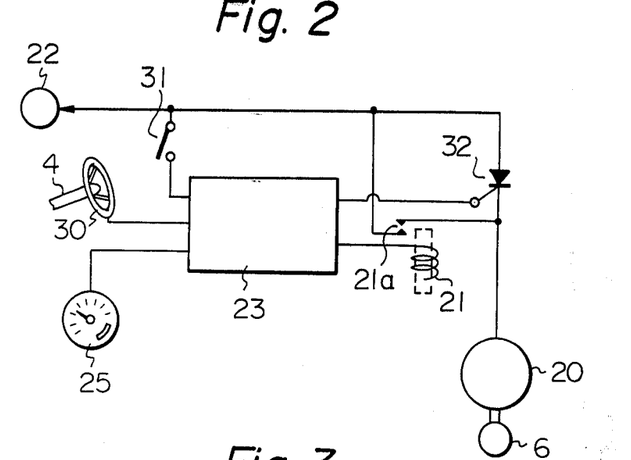
FIG. 2 is a schematic drawing of electric motor controls which include an electronic device and relay contacts.

In summarizing the explanation of the figures, the embodiment of FIG. 1 uses the relay 21 and relay contact 21a as elements of a switching means 27 for controlling energization of the motor 20. In the embodiment of FIG. 2, a thyristor 32 is provided in combination with the apparatus shown in FIG. 1. The embodiment of FIG. 3 includes the combination of a relay 40 with a main contact 41 and an auxiliary contact 42 and a transistor 44.

In FIG. 2, an electronic device, that is, a thyristor 32, is used in association with the relay contacts 21a. An electric motor 20 is electrically connected to an electric source or battery 22 through the thyristor 32. The gate of thyristor 32 is electrically connected to a controller 23 to be controlled thereby. Controller 23 is electrically connected to a steering wheel rotation sensor 30 which is actuated upon rotation of the steering wheel 4. The steering wheel rotation sensor 30 is preferably exemplified as a touching switch, a pulse encoder, a small sized alternator or a torque sensor and etc. Controller 23 is also electrically connected to a pressure switch 31 for the engine oil to be activated thereby. The switch 31 provides an output signal when the engine is running. It is naturally noted that thyristor 32 may generally be replaced by a semiconductor element.

The operation of the embodiment shown in FIG. 2 is explained as follows: Upon starting of the engine, the switch 31 is closed. Subsequent rotation of steering wheel 4 causes the steering wheel rotation detector 30 to generate an electrical signal. At low vehicle speeds, the controller 23 respond to these signals by applying an electrical voltage to the gate of thyristor 32 according to the electrical signal. This changes the thyristor 32 from a nonconducting state to a conducting state. Electric motor 20 is immediately energized to provide a quick response to rotation of the steering wheel 4. The relay 21 then closes relay contact 21a to complete a circuit which can excite electric motor 20 in parallel to thyristor 32.

Figure 5:
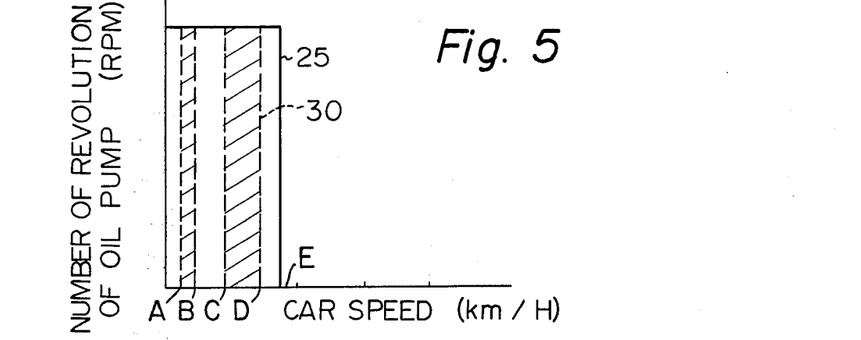
FIG. 5 is a graph, generally similar to FIG. 4, illustrating the manner in which the power steering pump is started and stopped in accordance with rotation of the steering wheel during movement of a vehicle at different speeds.

Upon rotation of the steering wheel 4, at a vehicle speed indicated at A in FIG. 5, the controller 23 closes relay contacts 21a to energize the motor 20 to drive the pump 6. Upon completion of the steering operation, the vehicle is traveling at a speed indicated at B in FIG. 5. At this time, the steering rotation sensor 30 detects that the steering wheel 4 is no longer being rotated and the relay contacts 21a are opened to stop the motor 20. When a subsequent steering operation is undertaken, at a vehicle speed indicated at C in FIG. 5, the motor 20 again drives the pump 6. Upon completion of the steering operation, at a vehicle speed indicated at D in FIG. 5, the motor is again stopped.

When the vehicle speed exceeds the speed indicated at E in FIG. 5, the controller 23 does not energize the motor in response to rotation of the steering wheel Therefore, the bypass valve 10 remains in the open condition and the vehicle is steered manually, that is, without power assistance.

As stated above, in FIG. 2, controller 23 receives a signal from steering sensor 30 to excite electric motor 20 and a full rotation of oil pump 6 is brought about as shown by the broken lines in FIG. 5, that is the state of power steering is brought about. Alternatively, if carspeed sensor 25 is arranged to activate controller 23 with a priority to steering sensor 30, oil pump 6 will effect an operation or non-operation as shown in the area given by the oblique lines and the full lines. The fact that the state of power steering or the state of manual steering can be attained through the communication of bypass valve 10 is the same as the fact obtained in the embodiment shown in FIG. 1.

Figure 3:
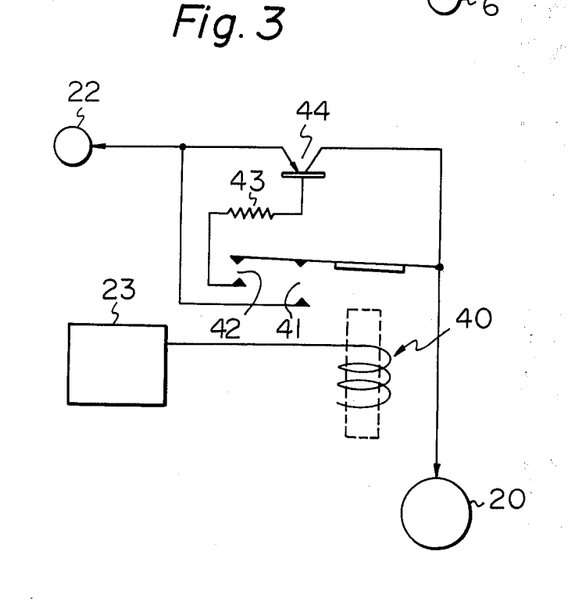
FIG. 3 is a schematic illustration of another embodiment of the electric motor controls wherein an auxiliary relay contact is closed to render an electronic device conducting and wherein a main relay contact is subsequently closed to complete a parallel circuit.

In FIG. 3, a relay 40 with a main contact 41 and an auxiliary contact 42 as well as an electronic device, that is, a transistor 44, are combined in addition to the construction shown in FIG. 1. An electric motor 20 is electrically connected to an electric source 22 through the collector to emitter circuit of transistor 44. One contact point of main contact 41 is electrically connected to electric source 22 and the other contact point of main contact 41 is electrically connected to electric motor 20, directly. One contact point of auxiliary contact 42, which closes prior to main contact 41 closure and opens after main contact 41 opening, is electrically connected to the base of transistor 44 through a resistor 43 and the other contact point of auxiliary contact 42 is electrically connected to the other contact point of main contact 41. It is naturally noted that transistor 44 may generally be replaced by a semiconductor element.

The operation of the embodiment shown in FIG. 3 is explained as follows: The signal coming from controller 23 energizes relay 40 to first close auxiliary contact 42 to reduce the electric potential at the base of transistor 44 through the drop in resistor 43. Transistor 44 turns into a conductive state and electrical motor 20 is excited with a quick response to be started. Then, main contact 41 is second closed to complete a circuit which can excite electric motor 20 in parallel to transistor 44. When electric motor 20 is stopped by controller 23, relay 40 opens first main contact 41 only. The current exciting electric motor 20 flows in a circuit from electric source 22 to the emitter to collector circuit of transistor 44 as well as in a circuit from electric source 22 through the emitter to base circuit of transistor 44 to auxiliary contact 42. Thereafter, when auxiliary contact 42 opens, the electric potential at the base of transistor 44 becomes zero to open the emitter to collector circuit of transistor 44. Under this condition, the current flowing through auxiliary contact 42 is smaller than the current flowing through the emitter to collector circuit due to the existence of resistor 43. This means that less damage arising from any spark is given to the main contact as well as the auxiliary contact. It is also well noted that a semiconductor switch is simply used to control the electric motor without using any relay and its associated contacts.

Figure 6:
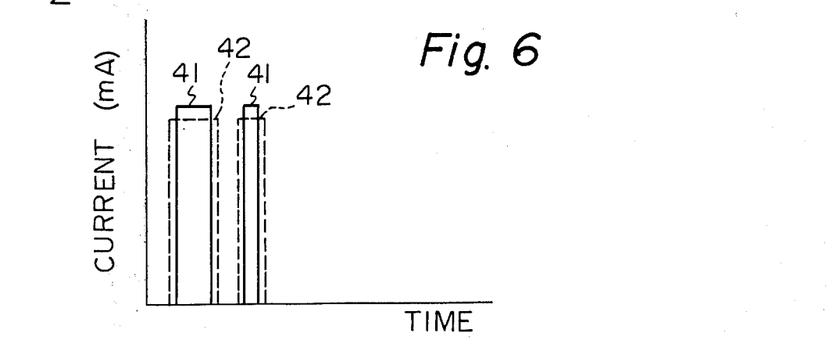
FIG. 6 is a graph illustrating the manner in which the current conducted to an electric motor is varied during a power steering operation.

As stated above, in FIG. 3, the current in main contact 41 is intermittent as shown by the full lines in FIG. 6 and the current in auxiliary contact 42 is also intermittent as shown by the broken lines in the same figure, by using two kinds of contacts and the state of power steering can be obtained with a quick response and less wear and tear in the contact points.

When a steering operation is undertaken at relatively low vehicle speeds, the controller 23 energizes the relay 40 to quickly close its auxiliary contact 42 (FIG. 3). This results in a relatively small current being conducted from the base of the transistor 44 through the resistor 43 to change the state of the transistor from a nonconducting state to a conducting state. At this time, the main relay contacts 41 are open. Therefore, the electric motor 20 is initially energized by the current conducted through the transistor 44.

After initial energization of the motor 20, the main relay contacts 41 are closed to complete a second circuit in parallel with the transistor 44. This second circuit includes the relay contacts 41 which have very little resistance and conduct a relatively large amount of the current required to drive the motor 20 at a relatively high speed.

Upon completion of the steering operation, the main contacts 41 of the relay are opened while the auxiliary contacts 42 remain closed. At this time, the motor 20 is still energized by electrical energy conducted through the transistor 44. The auxiliary contacts 42 are then opened and the transistor 44 changes from a conducting state to a nonconducting state and the motor 20 is deenergized.

As explained in FIG. 1 to FIG. 3, there is recognized that a benefit is obtained in which the cost is less expensive when the relay is only used as the element which constitutes the electronically operated on-off means, a benefit is obtained in which the response is good when a combination of the relay and the thyristor is used as the elements referred to above and a benefit is obtained in which the quick response is obtained and a long life operation is gained when a combination of the relay with two kinds of contact points and the transistor is used as the elements referred to above.

Figure 4:
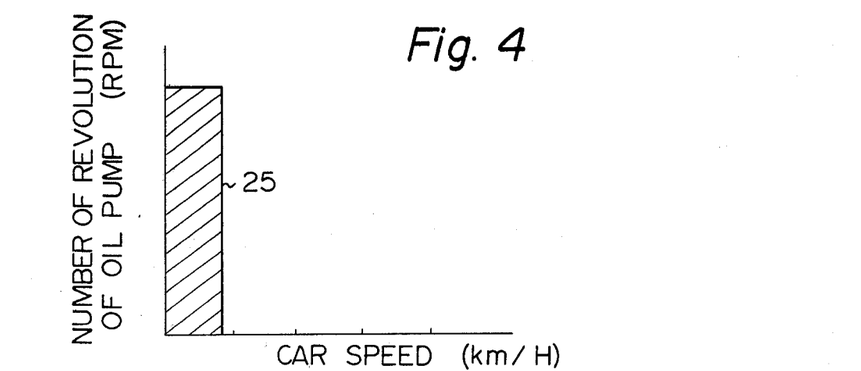
FIG. 4 is a graph illustrating the relationship between the speed of the vehicle and the angular velocity at which a power steering pump is driven.

The circuits shown in FIGS. 1 to 3 provide the performances as shown in FIGS. 4 to 6. In these performances, the electric motor stops at the time when the car speed reaches a previously determined value to decrease the rotation of the oil pump to zero and, as stated above, the state of power steering is directly shifted to the state of manual steering. If the circuits are partially modified, for example, in a manner that the voltage to be applied to the electric motor is reduced to about 50 to 60% of the full potential of the electrical source by means of a semiconductor, the number of rotation of the oil pump will accordingly be reduced. Therefore, if the circuits thus modified are actually used, the performance will be modified as that shown in FIG. 11. More particularly, when the car speed reaches a previously detemined value, such as 15 km/H, after the electric motor is started by using the relay, the voltage applied to the electric motor is reduced to decrease the number of rotation of the oil pump from 2500 RPM to 1500 RPM and the state of power steering will be shifted to the semiconductor switching region from the relay-on region. After the car speed is increased, when the electric motor is completely stopped at another previously determined car speed, such as 40 km/H, the state of power steering is then completely shifted to the state of manual steering. As explained above, the shock to be generated in the conduit arrangement from the full rotations of the electric motor and the oil pump to the complete stop thereof will be moderated by providing the semiconductor switching region between the relay-on region of the state of power steering region and the state of manual steering region.

Figure 11:
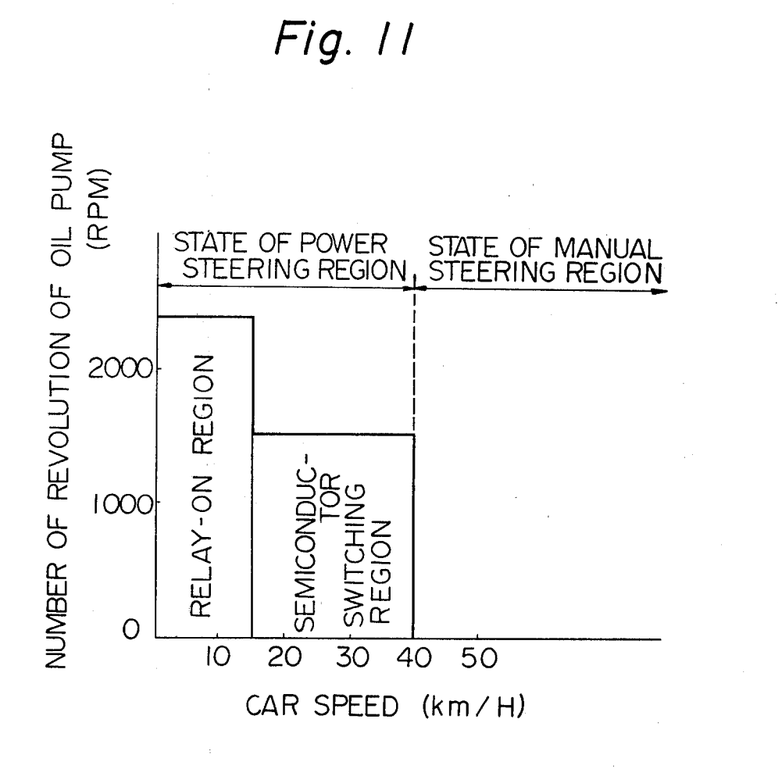
FIG. 11 is a graph depicting the relationship between the speed of operation of a power steering pump and the speed of a car.

Upon initiation of a steering operation at speeds below 15 km/H, with the controller 23 of FIG. 3 modified to provide the performance shown in FIG. 11, the controller causes the relay 40 to close its auxiliary contacts 42. This changes the state of the transistor 44 from a nonconducting state to a conducting state. To effect initial energization of the motor 20. The main contacts 41 of the relay 40 are then closed to provide a circuit to conduct relatively large amounts of current to drive the pump 20 at a speed of approximately 2500 RPM. Upon completion of the steering operation at a speed below 15 km/H, the main relay contacts 41 are opened so that the motor 20 is energized from the current conducted through the transistor 44. The auxiliary relay contacts 42 are then opened and the operation of the motor 20 is stopped.

Upon initiation of a steering operation at a speed above 15 km/H, for example at a speed of 20 km/H, the controller 23 (FIG. 3) energizes the relay 40 sufficiently to close only the auxiliary contacts 42. This changes the transistor 44 from a nonconducting state to a conducting state and the motor 20 is energized by the current conducted from the battery 22 through the transistor 44. The main relay contacts 41 remain open. Therefore, the voltage applied to the motor 20 is reduced to approximately 50 or 60% of the full potential of the battery 22. This results in the motor 20 being driven at a relatively low speed, for example 1500 RPM (FIG. 11). Upon completion of a steering operation, the controller 23 deenergizes the relay 40 and contacts 42 are opened. This results in the transistor 44 being rendered nonconducting and the motor 20 being stopped.

Figure 9:
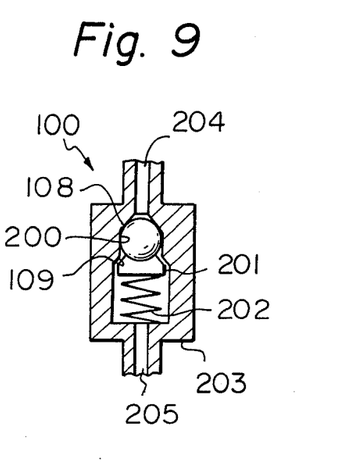
FIG. 9 is a schematic illustration of a pressure relief valve used in association with the apparatus of FIG. 1, the pressure relief valve being shown in a closed condition.
Figure 10:
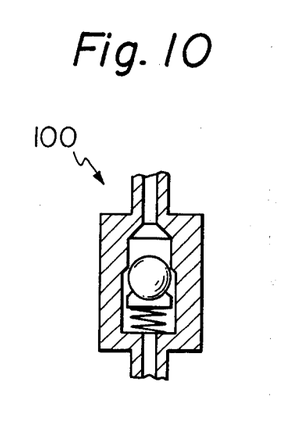
FIG. 10 is a schematic illustration of the pressure relief valve of FIG. 1, the valve being shown in an open condition.

The construction and the operation of reducing relief valve 100 are, here, briefly explained in FIGS. 9 and 10. Reducing relief valve 100 has a housing 203 and in housing 203 are provided an RP line pressure port 204 connected to the supply port P of oil pump 6 and an RT tank port 205 connected to the return port T of oil pump 6, said RT tank port 205 being located opposite said RP line pressure port 204. A first relief part 108 is formed near RP line pressure port 204 and a second relief part 109 is formed in continuation with first relief part 108. The inner diameter of second relief part 109 is made larger than the inner diameter of first relief part 108. A sphere 200 is accommodated within first relief part 108 and is normally urged toward RP line pressure port 204 by means of a spring 202 through a guide 201, as shown in FIG. 9.

Figure 14:
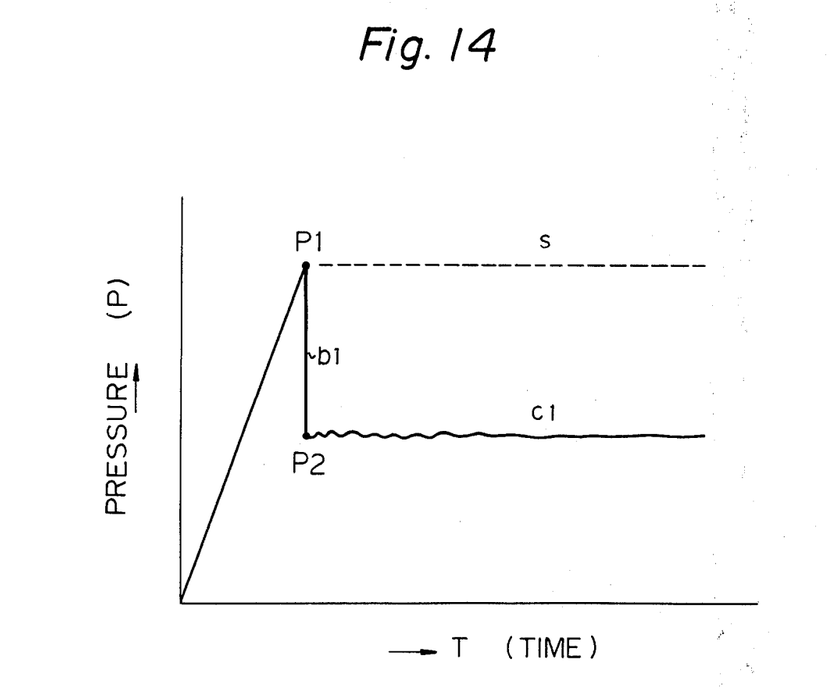
FIG. 14 is a graph depicting the operation of the pressure relief valve

When the pressure of the working oil applied to RP line pressure port 204 of reducing relief valve 100 from the supply port P of oil pump 6 increases to result in an over pressure to reach point P1 of FIG. 14, due to some extraordinary causes, for example, steering wheel 4 is halted to be held at the extremity of steering in the rack ends or an overload is applied to power cylinder 1 to hold power cylinder at a locking state, ball 200 displaces downward in the figure against spring 202 and enters into the interior of second relief part 109. A path will be, thus, generated between ball 200 and second relief part 109 and the pressure at point P1 which is applied to RP line pressure port 204 is led to RT tank port 205 to be reduced to a point P2 along a line b1.

Figure 12:
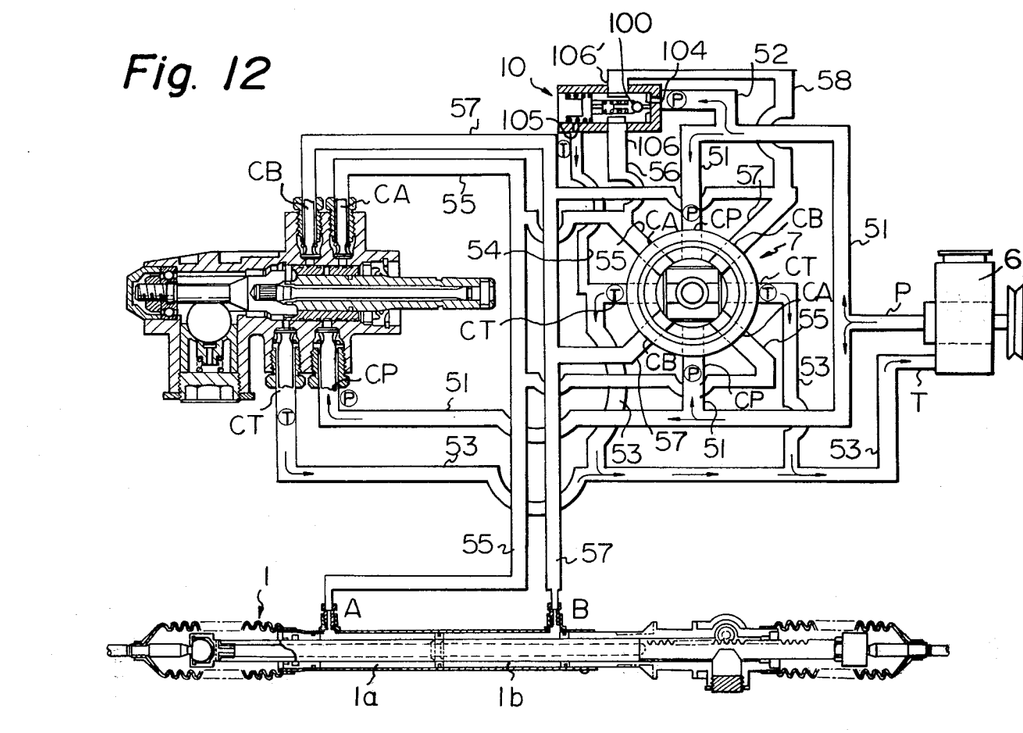
FIG. 12 is an explanatory drawing illustrating the relationship between an electrically driven oil pump, a control valve, a power steering motor, a bypass valve and a pressure relief valve.

An embodiment of the connection between the oil pump, the control valve, the power cylinder, the bypass valve and the reducing relief valve given in the embodiments shown in FIGS. 1 to 3 is illustrated in FIG. 12.

In FIG. 12, a supply port P of electrically driven oil pump 6 is connected to a supply port CP of control valve 7 via a pipe 51 and is connected to a BP line pressure port 104 of bypass valve 10 via a pipe 52. A return port T of electrically driven oil pump 6 is connected to a return port CT of control valve 7 via a pipe 53 and is connected to a BT tank port 105 of bypass valve 10 via a pipe 54. A port A which leads to chamber 1a of power cylinder 1 is connected to a port CA of control valve 7 via a pipe 55 and is connected to a BA port 106 of bypass valve 10 via a pipe 56. A port B which leads to chamber 1b, of power cylinder 1 is connected to a port CB of control valve 7 via a pipe 57 and is connected to a BB port 106' of bypass valve 10 via a pipe 58.

Figure 13:
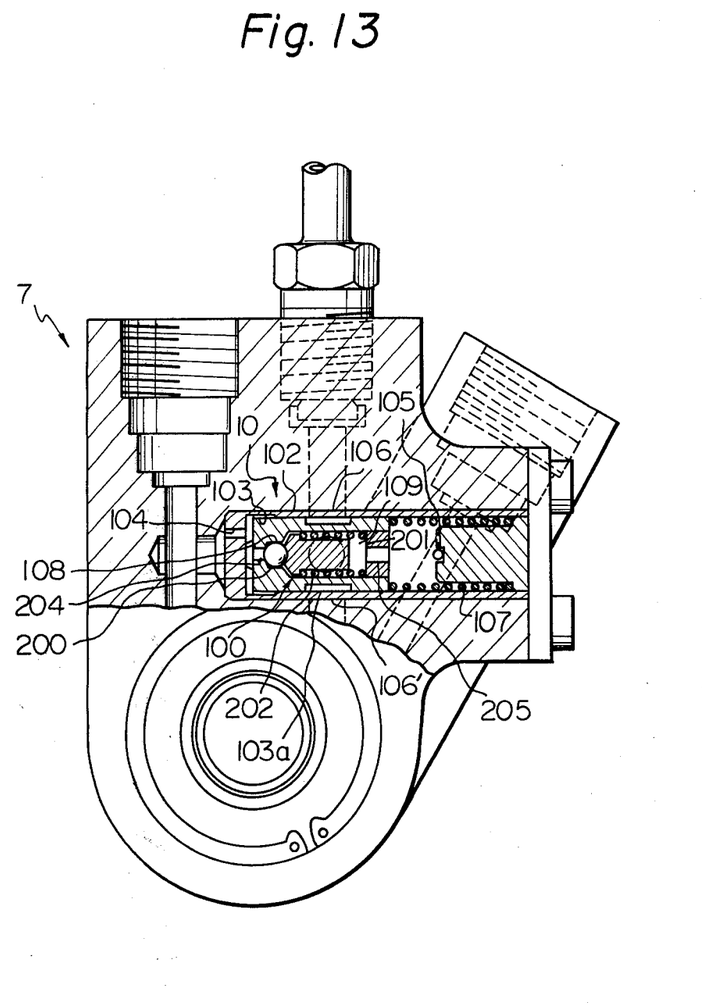
FIG. 13 is a fragmentary sectional view of one embodiment of the bypass valve and pressure relief valve.

In FIG. 13, is shown an embodiment of the arrangement between control valve 7, bypass valve 10 and reducing relief valve 100, all illustrated in FIG. 12. Control valve 7 is provided with the supply port CP, the return port CT, the port CA and the port CB and while bypass valve 10 is mounted within control valve 7 in the embodiment, so that all the ports of control valve 7 can be utilized as the respective ports of bypass valve 10, bypass valve 10 is, in general, mounted independent of control valve 7. While reducing relief valve 100 is accommodated within the spool 103 of bypass valve 10 in the embodiment, reducing relief valve 100 is, in general, mounted also independently of bypass valve 10. Reducing relief valve 100 is provided so as to reduce the over pressure brought about when the manipulation of the steering wheel is held at the rack end in the state of power steering and RP line pressure port 204 and RT tank port 205 of reducing relief valve 100 are, respectively, mounted near BP line pressure port 104 and BT tank port 105, said ports 104 and 105 communicating with each other through the interior of reducing relief valve 100.

The overall operations of control valve 7, bypass valve 10 and reducing relief valve 100 are now explained in putting them together.

Under a normal state of power steering, a working oil of a prescribed pressure is supplied to supply port CP and BP line pressure port 104 from supply port P and the pressure of the working oil will increase with the rotation of oil pump 6. When the pressure exceeds the compression pressure of spring 107, spool 103 displaces toward BT tank port 105 and the communication between BA port 106 and BB port 106' is disconnected. Manipulation of steering wheel 4 leads the working oil at supply port CP to port CA or port CB in accordance with the direction steering wheel 4 is manipulated. The working oil is applied to chamber 1a or chamber 1b to act on piston 2 and action of piston 2 assists the manipulation of steering wheel 4.

Next, when electric motor 20 and oil pump 6 stop under the control of controller 23 a state of the manual steering initiates. If steering wheel 4 is manually manipulated, the working oil, then being supplied to supply port CP, must flow a rather narrow path, which is determined by the manual manipulation, to reach port CA or port CB and the relatively high resistivity due to the narrowness makes steering wheel 4 rather difficult to be handled. Under this condition the pressure of the working oil acting on BP line pressure port 104 is decreasing gradually from the prescribed pressure, spool 103 returns toward BP line pressure port 104 by the compression force of spring 107 and the communication between BA port 106 and BB port 106' restores. Steering wheel 4, then, can easily be manipulated due to the communication as the working oil will receive only the resistivity inherent to the pipe the working oil is actually flowing through.

Last, when the load to oil pump 6 is abruptly increased owing to the road situation to a limit which cannot be adjusted by controller 23 or electronically operated on-off means 27, electric motor 20 may be overload. The pressure of the working oil at supply port P may reach a pressure indicated by a point P1 as shown in FIG. 14, such as 70 kg/cm$^2$ and if the pressure is long maintained along a line s as shown in FIG. 14, electric motor 20 may possibly be burst to be destroyed. When the pressure indicated by point P1 is applied to RP line pressure port 204, sphere 200 will displace toward RT tank port 205 with first relief part 108 and second relief part 109 open. The pressure indicated by point P1 reduces to a pressure indicated by a point P2 as shown in the same figure along a line b1 and is maintained along a line c1 as shown in the same figure. Under this condition, reducing relief valve 100 naturally works so that the pressure of the working oil is set at a limit which is allowable by the ability for keeping the steering power, in other words, the pressure of the working oil is only reduced with the steering state maintained as it was.

It will be noted here that reducing of the pressure due to the reducing relief valve of the present invention is effectively obtained by the hysteresis performance of the relief means and, therefore, the reducing relief operation can be effected extreme stably.

As explained above, in the electrically driven oil pressure power steering apparatus of this invention, the following operational effect can be noted as explained below.

1. The state of power steering can be shifted to the state of manual steering by manipulating the bypass valve in conjunction with the pressure of the working oil sent forth from the oil pump by the on-off operation thereof.

2. The selection of the two states of steerings is extremely simple as the selection is effected by the manipulation of the electric motor. As the communication of the working oil in the bypass valve is linked to the on-off operation of the electric motor, the whole construction of the apparatus is quite simple, the resistivity in the path, the working oil is actually flowing, is low so that the damage due to the flow resistance is made less and a safe operation can be obtained.

3. When the pressure of the working oil is extraordinarily increased at the over steering lock in the end of the rotation of the steering wheel, the current in the electric motor is decreased by the reducing relief valve to protect the contacts in the electronically operated on-off means and to decrease the capacity of the semiconductor element to the effect that the energy consumed in the electric motor, as the power source of the oil pump, can be saved.

4. The performance of the reducing relief valve can be stabilized by decreasing the oil pressure output of the oil pump to the limit, the steering holding ability may allow, by providing a hysteresis function with the relief operation of the reducing relief valve.

5. The over pressure of the working oil due to the sudden increase of the load in the oil pump is decreased by providing the reducing relief valve between the supply port and the return port of the oil pump and the temperature of the working oil is, accordingly, decreased so that the coil of the electric motor is prevented from being burnt.

6. The switching over between the state of power steering and the state of manual steering can be effected without any sensible discontinuity by changing the power supply to the electric motor in accordance with the car speed.

In view of the foregoing description, it is apparent that a power steering apparatus (FIG. 1) constructed in accordance with the present invention is used to turn a steerable wheel (not shown) of a vehicle in response to rotation of a steering wheel 4. The apparatus includes a pump 6 which is driven by an electric motor 20 to supply fluid to a power steering motor 1. Upon initiation of a steering operation at relatively low vehicle speeds, an electronic device 32, such as a thyristor or transistor, is changed from a nonconducting state to a conducting state to initially energize the electric motor 20 which drives the power steering pump 6. Once the motor 20 has been initially energized by current conducted through the electronic device, a pair of relay contacts 21a are closed to complete a parallel circuit (FIG. 2) through which current is conducted to the electric motor 20 to drive the power steering pump 6 at a relatively high speed. This enables the electric motor 20 to be quickly energized upon initiation of a steering operation and tends to enhance the operating life of the relay contacts 21a since the electric motor 20 has started to operate before the contacts close.

In accordance with another feature of the present invention, the current for energizing the electric motor 20 is conducted through the relay contacts 21a only when the vehicle speed is below a predetermined speed. Thus, at relatively low vehicle speeds, the relay contacts 21a are closed to increase the current conducted to the electric motor 20 to drive the pump 6 at a relatively high angular velocity. However, at vehicle speeds above the predetermined speed, the relay contacts 21a are not closed. This results in the electronic device 32 conducting a reduced current to operate the motor 20 to drive the pump 6 at a reduced angular velocity as the vehicle speed increases.

If the electric motor 20 is operated to drive the power steering pump 6 before the engine of the vehicle is started, the electric motor would discharge the battery 22. In order to prevent this from happening, the electric motor 20 is operated to drive the power steering pump 6 only when a signal generator 24, driven by the engine of the vehicle, provides an output signal indicating that the engine is running. At relatively high vehicle operating speeds, the resistance to turning movement of the steerable vehicle wheels is so small as not to require power assistance. Therefore, at these speeds a bypass valve 10 is opened to connect opposite chambers 1a and 1b of the power steering motor 1 in fluid communication with each other. At this time a manual steering operation can be undertaken with relatively little resistance from the power steering motor 1.

What is claimed is:

1. An apparatus for operating a power steering motor and turning a steerable vehicle wheel in response to rotation of a steering wheel, said apparatus comprising a hydraulic pump, electric motor means connected with said pump for driving said pump to supply hydraulic fluid to the power steering motor, a vehicle speed sensor, and control means connected with said electric motor means and vehicle speed sensor for energizing said motor means, said control means comprising an electrical circuit having a first circuit portion for conducting electrical energy to energize said motor means to drive said pump at a first angular velocity while the vehicle is traveling at a first speed, a second circuit portion connected in parallel with said first circuit portion for conducting electrical energy to energize said motor means to drive said pump at a second angular velocity which is less than the first angular velocity while the vehicle is traveling at a second speed which is greater than the first speed, and means for rendering said first circuit portion ineffective to conduct electrical energy to said motor means while the vehicle is traveling at the second speed.

2. An apparatus as set forth in claim 1 wherein said first circuit portion includes a pair of contacts operable between an open condition in which they are ineffective to conduct electrical energy and a closed condition in which they are effective to conduct electrical energy while the vehicle is traveling at the first speed, said means for rendering said first circuit portion ineffective including means for maintaining said contacts in the open condition while the vehicle is traveling at the second speed, said second circuit portion including electronic means for conducting electrical energy to energize said motor means while the vehicle is traveling at the second speed and said contacts are in the open condition.

3. An apparatus as set forth in claim 2 wherein said control means includes means for changing said electronic means from a nonconducting state in which said electronic means is ineffective to conduct electrical energy to a conducting state in which said electronic means is effective to conduct electrical energy while said contacts are in the open condition and the vehicle is traveling at the first speed to thereby initiate operation of said electric motor means under the influence of electrical energy conducted by said electronic means.

4. An apparatus as set forth in claim 3 wherein said control means includes means for maintaining said electronic means in a conducting state while said contacts are in the closed condition.

5. An apparatus as set forth in claim 1 further including a steering control valve connected in fluid communication with said pump and operable to control the direction of operation of the power steering motor and the direction of turning movement of the steerable vehicle wheel, first conduit means for conducting fluid pressure from said steering control valve to the power steering motor during turning movement of the steerable vehicle wheel in a first direction and for conducting fluid from the power steering motor to said steering control valve during turning movement of the steerable vehicle wheel in a second direction, second conduit means for conducting fluid pressure from said steering control valve to the power steering motor during turning movement of the steerable vehicle wheel in the second direction and for conducting fluid from the power steering motor to the steering control valve during turning movement of the steerable vehicle wheel in the first direction, bypass valve means connected with said first and second conduit means between said steering control valve and power steering motor, said bypass valve means being operable between an open condition connecting said first and second conduit means in fluid communication and a closed condition blocking fluid flow between said first and second conduit means, and means for operating said bypass valve means from the open condition to the closed condition upon operation of said electric motor means to drive said pump.

6. An apparatus as set forth in claim 1 further including signal generator means for providing an output signal during operation of an engine for driving the vehicle, said control means including means for rendering said electric motor means effective to drive said pump only when said signal generator means provides an output signal.

7. An apparatus as set forth in claim 1 further including detector means for detecting rotation of the steering wheel, said control means being connected with said detector means, said control means being operable to energize said motor means to drive said pump at the first angular velocity during rotation of the steering wheel while the vehicle is traveling at the first speed and being operable to energize said motor means to drive said pump at the second angular velocity during rotation of the steering wheel while the vehicle is traveling at the second speed.

8. An apparatus as set forth in claim 7 wherein said control means includes means for maintaining said motor means in an energized condition for a predetermined period of time after interruption of rotation of the steering wheel.

9. An apparatus for operating a power steering motor and turning a steerable vehicle wheel in response to rotation of a steering wheel, said apparatus comprising a pump, electric motor means connected with said pump to drive said pump to supply fluid to the power steering motor, detector means for detecting rotation of the steering wheel, and control means connected with said detector means and motor means for energizing said motor means upon rotation of the steering wheel, said control means including electronic means connected with said motor means and operable between a nonconducting state in which said electronic means is ineffective to conduct electrical energy and a conducting state in which said electronic means is effective to conduct electrical energy, a pair of contacts connected with said motor means and operable between an open condition in which said contacts are ineffective to conduct electrical energy and a closed condition in which said contacts are effective to conduct electrical energy, and means responsive to rotation of the steering wheel for changing said electronic means from the nonconducting state to the conducting state while said contacts are in the open condition to effect operation of said motor means under the influence of electrical energy conducted by said electronic means and for operating said contacts from the open condition to the closed condition while said motor means is energized by electrical energy conducted by said electronic means.

10. An apparatus as set forth in claim 9 wherein said control means further includes means for maintaining said contacts in the open condition while the vehicle is traveling at a speed above a predetermined speed so that said motor means is energized only by electrical energy conducted by said electronic means upon rotation of the steering wheel at vehicle speeds above the predetermined speed.

11. An apparatus as set forth in claim 9 wherein said control means includes means for effecting operation of said contacts from the closed condition to the open condition while said electronic means is in the conducting state upon termination of rotation of the steering wheel.

12. An apparatus as set forth in claim 9 further including signal generator means for providing an output signal during operation of an engine for driving the vehicle, said control means including means for maintaining said contacts in the open condition and said electronic means in a nonconducting state in the absence of an output signal from said signal generator means.

13. An apparatus comprising a power steering motor adapted to be connected with a steerable vehicle wheel, said power steering motor having a first motor chamber for receiving fluid under pressure to effect operation of said motor to turn the steerable vehicle wheel in a first direction and a second motor chamber for receiving fluid under pressure to effect operation of said motor to turn the steerable vehicle wheel in a second direction, a steering control valve, means for connecting said steering control valve with a rotatable steering wheel, first conduit means for connecting said first motor chamber in fluid communication with the steering control valve, second conduit means for connecting said second motor chamber in fluid communication with the steering control valve, a pump connected in fluid communication with said steering control valve, electric motor means connected with said pump for driving said pump to supply fluid under pressure to said steering control valve, a vehicle speed sensor, detector means for detecting rotation of the steering wheel, control means connected with said electric motor means, vehicle speed sensor and detector means for operating said electric motor means to drive said pump during rotation of the steering wheel when the vehicle is traveling at speeds below a predetermined speed and for rendering said electric motor means ineffective to drive said pump during rotation of the steering wheel when the vehicle is traveling at speeds which are greater than the predetermined speed, bypass valve means connected in fluid communication with said first and second conduit means at locations between said steering control valve and said power steering motor, said bypass valve means being operable between an open condition connecting said first and second conduit means in fluid communication and a closed condition blocking fluid flow between said first and second conduit means, and means for operating said bypass valve means from the open condition to the closed condition upon rotation of the steering wheel and operation of said electric motor means to drive said pump when the vehicle is below the predetermined speed.

14. An apparatus as set forth in claim 13 further including third conduit means for conducting fluid under pressure from said pump to said steering control valve, pressure relief valve means connected in fluid communication with said third conduit means for reducing the fluid pressure in said third conduit means when said power steering motor is subjected to an excessive load.

15. An apparatus as set forth in claim 14 wherein said relief valve means includes a first part for reducing a portion of the fluid pressure in said third conduit means when said power steering motor is subjected to an excessive load and a second relief part for further reducing the pressure reduced by the first relief part and maintaining a predetermined reduced pressure when said power steeing motor is subjected to an excessive load.

16. An apparatus for effecting operation of a power steering motor to turn a steerable wheel of a vehicle having an engine, said apparatus comprising a pump, electric motor means for driving said pump to supply fluid to the power steering motor, signal generator means driven by the engine for providing an output signal only during operation of the engine, and control means connected with said electric motor means and said signal generator means for energizing said electric motor means to drive said pump only when said signal generator means is providing an output signal.

* * * * *

UNITED STATES PATENT AND TRADEMARK OFFICE
CERTIFICATE OF CORRECTION

PATENT NO. : 4,417,640
DATED : November 29, 1983
INVENTOR(S) : Michio Abe et al.

It is certified that error appears in the above-identified patent and that said Letters Patent is hereby corrected as shown below:

On the title page insert

-- Related U.S. Application Data

[63] Continuation-in-part of Ser. No. 221,612, Dec. 31, 1980, now U.S. Pat. No. 4,392,540 --.

Signed and Sealed this

Twenty-eighth Day of August 1984

[SEAL]

Attest:

GERALD J. MOSSINGHOFF

Attesting Officer — Commissioner of Patents and Trademarks